United States Patent [19]
Wills

[11] Patent Number: 6,132,307
[45] Date of Patent: Oct. 17, 2000

[54] REMOVABLE INTAKE SCREEN FOR REFRIGERATION UNIT AIR FLOW PANEL

[75] Inventor: James H. Wills, Nisswa, Minn.

[73] Assignee: Image Rotomolding Enterprises, Inc., Brainerd, Minn.

[21] Appl. No.: 09/201,480

[22] Filed: Nov. 30, 1998

[51] Int. Cl.[7] .................................................. B60H 1/32
[52] U.S. Cl. ............................ 454/118; 62/239; 62/407
[58] Field of Search ................................. 454/88, 90, 91, 454/118; 62/239, 329, 407, 413, 414; 410/121, 129

[56] References Cited

U.S. PATENT DOCUMENTS

| | | |
|---|---|---|
| 4,399,737 | 8/1983 | Severson . |
| 4,726,196 | 2/1988 | Zajic . |
| 5,054,295 | 10/1991 | Goulooze . |
| 5,101,643 | 4/1992 | Hicke . |
| 5,319,937 | 6/1994 | Fritsch et al. . |
| 5,427,237 | 6/1995 | Kiefer et al. . |
| 5,493,808 | 2/1996 | Munday . |
| 5,531,267 | 7/1996 | Ahmed et al. . |
| 5,769,704 | 6/1998 | Hennig et al. . |
| 5,807,046 | 9/1998 | Onken . |

*Primary Examiner*—Harold Joyce
*Attorney, Agent, or Firm*—Albert W. Watkins

[57] ABSTRACT

An air flow panel for mounting on a vertical wall in association with semi-trailer type refrigeration units has alternating valleys and ridges adjacent the vertical wall, each which terminate in circular openings facing the trailer floor. The ridges and valleys provide significant structural benefit, and in addition provide air flow pathways that terminate at different heights above the trailer floor. Small horizontal dimples extend from the vertical wall to a small groove adjacent the cargo surface. The juxtaposition of the small groove enhances structural integrity during significant impact from the cargo area. Circular screens are additionally pressed into the circular air intake openings. The intake screens have legs extending from a screen grid. The legs not only interlock with the panel but also space the grid from the panel, thereby increasing the effective screen size and decreasing resistance to air flow through the openings. Since the grid is spaced from the panel, the intake screen legs may be readily manually accessed and attached to or released from the panel without conflicting with the screen.

20 Claims, 4 Drawing Sheets

REMOVABLE INTAKE SCREEN FOR REFRIGERATION UNIT AIR FLOW PANEL

BACKGROUND OF THE INVENTION

1. Field of the Invention

This invention pertains generally to refrigeration systems, and more specifically to removable intake screens for air flow panels used in tractor-trailer type vehicular refrigeration units. The air flow panels distribute air flow throughout the trailer, so a refrigeration system may maintain sensitive cargo at a controlled temperature.

2. Description of the Related Art

Cargo is transported throughout the world in transportation containers. Over moderate land distances, these containers are most frequently trailers pulled by large truck tractors. Tractor trailers offer flexible distribution of cargo to nearly any location, and relatively rapid loading and unloading of cargo. The cargo is often grouped onto pallets, and then loaded with pallet jacks or fork lifts onto the trailers. Since the pallets are generally loaded at a warehouse or distribution center, diverse cargo may be loaded and unloaded quickly and reliably, and then transported by a driver to one or more destinations. Except in special circumstances such as livestock trailers, these trailers are closed and sealed to prevent roadway dirt, moisture and other contamination from damaging the load.

Unfortunately, during transport these trailers may reach temperature extremes that can also be damaging to some types of cargo. To protect more sensitive cargo, some trailers are equipped with refrigeration units. The refrigeration units are commonly mounted onto the front wall of the trailer where they are out of the way of cargo loading and unloading. The refrigeration units are designed with sufficient capacity to maintain constant temperature within a trailer, and generally have very large air volume throughput capacities. In conjunction with these refrigeration units, the load may be arranged to provide appropriate air passageways around and through, so that an even temperature is sustained throughout the entire load. Alternatively, the cargo may be divided into temperature controlled chambers and chambers without special temperature control, or into sections of various temperatures. A single trailer may then be used to carry temperature insensitive contents such as paper products together on the same load with produce, flowers or frozen goods.

While most refrigeration units are capable of moving very large volumes of air, maintaining that air flow throughout the cargo area has proven to be much more difficult. Where load arrangement is the only source of air flow control, protection of the cargo has been unreliable during transit, since the cargo tends to shift in response to sudden changes in direction or velocity. A sudden stop may shift the load towards the front wall of the trailer, which may then block the air inlet or outlet of the refrigeration unit. Furthermore, different fork lift operators and other loading personnel each may arrange a load differently. In some instances, the forklift operator may accidentally position cargo too close to the refrigeration unit. Variable load arrangement, either at the time of loading or during transit, has resulted in loss of many loads of cargo.

A number of attempts have been made in the prior art to reduce or eliminate these unfortunate losses of cargo, while simultaneously simplifying the job of the loading personnel. One early attempt involved the placement of a lattice panel over the front of the trailer. The lattice panel forced the cargo away from the front wall, thereby ensuring an air passageway between the load and front wall. While this lattice panel prevented blockage of the refrigeration unit intake and outlet, an improper load arrangement could still block the flow of air to the back of the trailer. In such an instance, outlet air would be drawn directly back to the inlet of the refrigeration unit without first passing over the cargo. The refrigeration unit would detect the appropriate environment temperature and shut off prematurely, still resulting in potential cargo spoilage or damage.

Solid bulkheads were developed to direct air through passageways along the exterior wall of the trailer. The bulkheads help ensure proper passage and distribution of air by separating the air from the load until the air is distributed to or drawn from appropriate places within the trailer. Early intake bulkheads were simply solid panels placed over the lattice work that had intake openings at the bottom of the trailer. An excellent example of a more recent corrugated bulkhead is disclosed by Severson in U.S. Pat. No. 4,399,737, the contents which are incorporated herein by reference. The corrugations disclosed therein provide structural strength in a unitary panel without requiring the addition of a large quantity of lattice. Nevertheless, with the advent of these solid bulkheads came other problems. For example, plastic, paper and other debris often drops to the bottom of the trailer during loading and unloading. This debris was inconsequential when the refrigeration unit was located high on the front trailer wall. The Severson type bulkheads and ducts, however, draw air from the floor and, in the process, also draw in the debris. The debris accumulates in either the bulkhead or the refrigeration unit, eventually reducing the air flow through the refrigeration unit to an unacceptable level. Structural integrity is also of great consequence in the tractor trailer environment, since the sudden stops that may cause load shifting may also on occasion launch the cargo into the unitary panel. The panel must be of sufficient strength and integrity to withstand the occasional high force impact and not crack, break or otherwise fail.

To prevent the debris from blocking flow through the inlet bulkhead, other variations have provided screens. Some of these place the screens at the air intake along the bottom. Unfortunately, these tend to quickly draw the debris from the floor, where the debris naturally rests, so the intake screens tend to become quickly clogged. Once the intake screen clogs, the refrigeration unit air flow reduces below a minimum acceptable level and the refrigeration unit will shut down. Again, this results in damaged cargo.

Other versions have raised the screen off of the floor, which tends to reduce the amount of debris which gets drawn in. Furthermore, when the refrigeration unit is shut off, the debris will drop from the screen down to the floor. Unfortunately, in order to move the intake screens up off of the floor, the screens have been located internally of the bulkhead and have been permanently attached, such as with rivets. While much of the debris will readily fall from the screen, there is always a certain content of the debris that for one reason or another will not detach. For example, many of the packages have adhesives that remain somewhat tacky. Other times, when a package is accidentally destroyed and contains sticky contents, such as ice cream or other confectionery, these packages or the debris therefrom will remain adhered to the screen even after the refrigerator unit shuts off. Because the screen is behind the bulkhead and is permanently attached, cleaning is extremely difficult.

More recently, Onken, in U.S. Pat. No. 5,807,046 also incorporated herein by reference, discloses a solid bulkhead having a number of flutes, or ridges, formed in the bulkhead wall. Air flow through the bulkhead may then be tailored by selectively opening or closing various ones of the flutes. However, no provision is made for debris that might get drawn into the flutes. As with earlier versions, this debris will accumulate within the bulkhead and eventually restrict air flow. Cleaning the bulkhead is an extremely difficult task.

Henning et al, in U.S. Pat. No. 5,769,704, the contents which are incorporated herein by reference, also disclose a unitary panel type bulkhead, but rely solely upon several sinusoidal air vanes therein for support. The base of the Henning et al structure which provides air inlet is relatively unsupported, and may be readily destroyed when impacted by cargo or forklift tines, which might extend out at the base of a load of cargo.

SUMMARY OF THE INVENTION

In a first manifestation, the invention is a removable intake screen that is removably attachable to openings through a tractor trailer refrigeration unit air flow panel. The intake screen comprises a screen grid, legs extending from the grid and having interlock means, whereby the legs space the grid from the air flow panel into an air bulkhead and allow removal and cleaning.

In a second manifestation, the invention is a ventilation system for a cargo container having forced air recirculation through a heat exchanger and further having an intake air duct with a first opening in a cargo hold within the cargo container. The intake air duct extends to the heat exchanger to form a relatively isolated air passage separate from the cargo hold. Cargo and debris which would adversely interact with the forced air recirculation is blocked from entry into the intake air duct by a snap-fit intake screen.

In a third manifestation, the invention is a refrigeration system in combination with a tractor trailer for carrying temperature-sensitive cargo in a cargo area having a floor, walls and a ceiling, comprising: a heat exchanger; an air flow panel adjacent to but spaced from a wall of the tractor trailer and forming an air flow pathway therebetween leading into the heat exchanger, a first set of vertically extending rectangular polyhedrons terminating at a bottom thereof with a first set of inlets through the air flow panel adjacent the cargo floor; a second set of inlets through the air flow panel vertically displaced from the first set of inlets, the second set of inlets interspersed between the first set of inlets and alternating therewith, thereby opening into the cargo area in spaces between the first set of vertically extending rectangular polyhedrons; and screens within the inlets having manually removable fasteners retaining screens to inlets; whereby the removable screens prevent passage of debris into the air flow pathway and wherein the removable screens may be manually removed for cleaning.

OBJECTS OF THE INVENTION

A primary object of the present invention is to provide an air flow panel which is minimally restrictive to the flow of air therethrough. Another object of the invention is to provide a filter at the inlet which is manually removable and quickly and easily cleaned. A further object of the invention is to provide an air flow panel having inlets at several different elevations, the collection which are difficult to block and restrict. Yet another object of the invention is to provide an inlet filter which is relatively self-cleaning each time the refrigeration unit is shut off. A further objective is to provide an air flow panel which is robust enough to withstand the harsh environment of a tractor trailer cargo area, which may include not only substantial temperature variations and thermal shock, but also mechanical impact and shock from the cargo or trailer. These and other objects of the invention are accomplished in the preferred embodiment, which will be more fully understood in conjunction with the drawings.

DESCRIPTION OF THE PREFERRED EMBODIMENT

Figure 1:
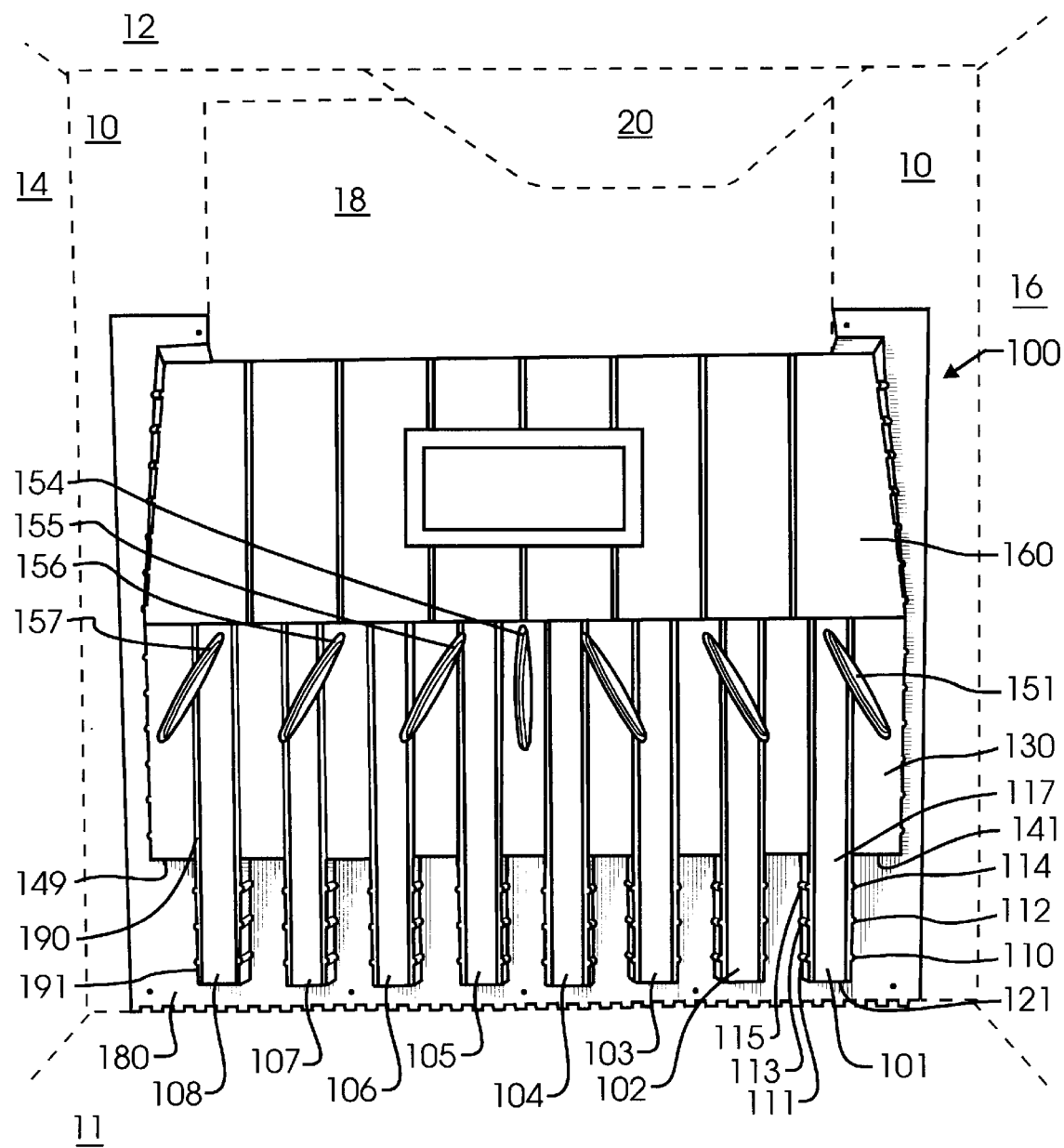
FIG. 1 illustrates a preferred embodiment bulkhead in accord with the present invention from a front view interior of the cargo space.

A typical"reefer" or refrigeration trailer extends longitudinally from the tractor. On the vertical wall closest to the tractor, the refrigeration unit is mounted. When the trailer back loading and unloading doors are opened, which are longitudinally distal to the tractor, the refrigeration unit 18 as shown in FIG. 1 is visible. The front wall 10 is also visible around refrigeration unit 18, which does not normally consume the entire front wall 10. In addition, floor 11, ceiling 12, left wall 14 and right wall 16 are also visible. Where appropriate, a refrigeration outlet bulkhead 20 may extend along ceiling 12 longitudinally from refrigeration unit 18. Floor 11 as shown in FIG. 1 may additionally have small troughs and ridges therein, though the actual surface of floor 11 is not critical to the present invention. Cargo is loaded, typically in the form of pallets of goods, up against the front of the trailer, typically adjacent from wall 10 and refrigeration unit 18. Without inclusion of an additional air flow panel or bulkhead, as aforementioned, air flow to refrigeration unit 18 may inadvertently be blocked either at the time of loading or during transit of cargo from one place to another.

To prevent cargo from blocking air flow into refrigeration unit 18, air flow panel 100 is attached to front wall 10 and overlaps with refrigeration unit 18 along a bottom side thereof. Panel 100 is desirably formed from a single sheet of low density polyethylene, though other materials would also potentially perform satisfactorily and panel 100 could conceivably be formed in different sections or components. Nevertheless, for ease of manufacture, shipping and installation, the single sheet has proven to be advantageous.

Panel 100 has at a lower side thereof a number of air passageways 101–108 in the general shape of rectangular polyhedrons. At the ends of each of the passageways 101–108 are openings 121–128 that extend through panel 100 and face floor 11. Since panel 100 is firmly attached to front wall 10 along flat surface 180 which extends around a periphery of panel 100, air passageways 101–108 are closed from each other and from the rest of the trailer by panel 100 and front wall 10. Each of passageways 101–108 has a number of small dimples 110–115. These dimples 110–115 serve to strengthen passageways 101–108 against crushing or flattening by cargo which might shift or be pressed against panel 100. Additional dimples may be located around the periphery of panel 100, or at any other point where panel 100 requires such reinforcement.

Small grooves or curves 190 in the surface of panel 100 extend down along each of the passageways 101–108 which provide some flexure within panel 100 during temperature cycling, but which also provide some flexure when a load is pressed thereagainst. In this way, when cargo presses against panel 100, passageways 101–108 are gradually loaded with force due to deformation along partial grooves such as 191, before the full force of the cargo must be endured by horizontal dimples 110–115. In this way, a more gradual shock absorption is provided which can, in more severe instances, save panel 100 from fracturing or breaking.

Figure 2:
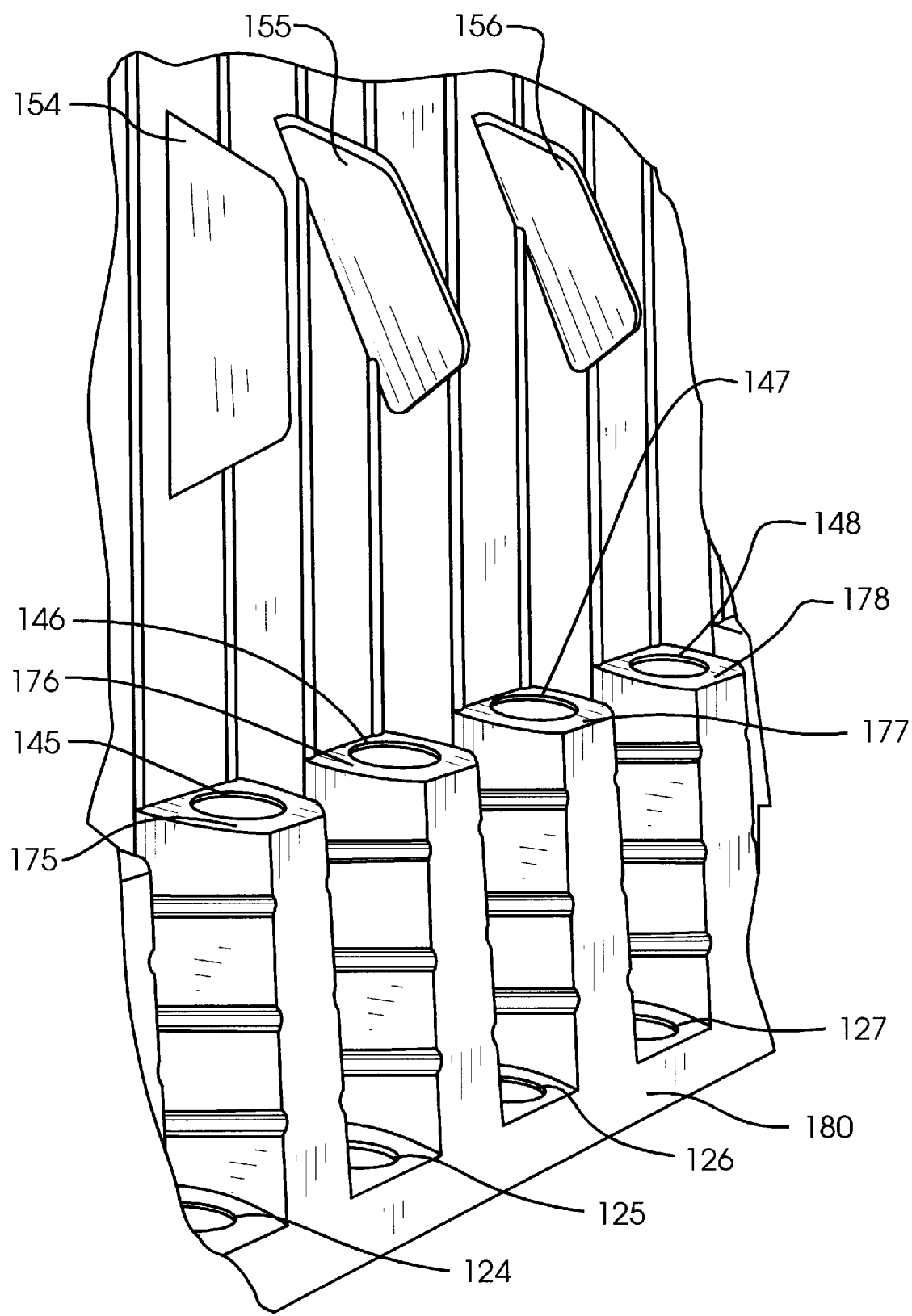
FIG. 2 illustrates the bulkhead of FIG. 1 by a partial section, looking from inside the air space between the preferred embodiment bulkhead and trailer front wall.

Between adjacent ones of passageways 101–108 there are small spaces which are generally too small for cargo to pass through. At the tops of each of these spaces there is a larger chamber 130. Between each of the passageways 101–108 and at the bottom surface of chamber 130 there are additional inlets 141–149. Inlets 145–148 and 124–127 are more visible from FIG. 2 by enlarged partial view, looking from the air passageway away from front wall 10 towards panel 100. These additional inlets 141–149 draw air from a second elevation and at a much greater distance from floor 11. In the event there is a large amount of debris along floor 11, lower inlets 121–128 may potentially become clogged. The second set of inlets 141–149 at a different elevation tend to be much less susceptible to clogging from floor debris. Furthermore, by alternating the inlets from low to high and back again, the likelihood of a single piece of debris, such as an errant sheet of plastic, for example, being progressively drawn against more and more of the inlets is diminished. In other words, the sheet may be drawn against a first inlet such as inlet 121, but it is not likely that the same sheet will also be drawn to the next inlet, which in this case is inlet 142, because of the large physical distance between inlets 121 and 142. Furthermore, the likelihood of inlet 122 in passageway 102 drawing the sheet is also reduced due to the extra spacing between passageways 101 and 102 provided for inlet 142.

Maintaining as much air flow as possible through refrigeration unit 18, while also providing a durable panel 100 resistant to the cargo and elements, is of utmost importance. The provision of ribs 190, 191 already discussed hereinabove provides flexibility through temperature cycling while also providing added impact resistance. This dual functionality is also embodied in vanes 151–157, which serve to direct air flowing between panel 100 and wall 10 towards refrigeration unit 18 while simultaneously providing minimal resistance to the air flow. This particular arrangement of vanes 151–157 maintains laminar air flow while reducing eddy current resistance, even though panel 100 is not otherwise shaped to force the laminar flow. In addition, vanes 151–157 provide the necessary impact support to chamber 130 to prevent chamber 130 from collapsing when cargo presses thereagainst.

Figure 3A:
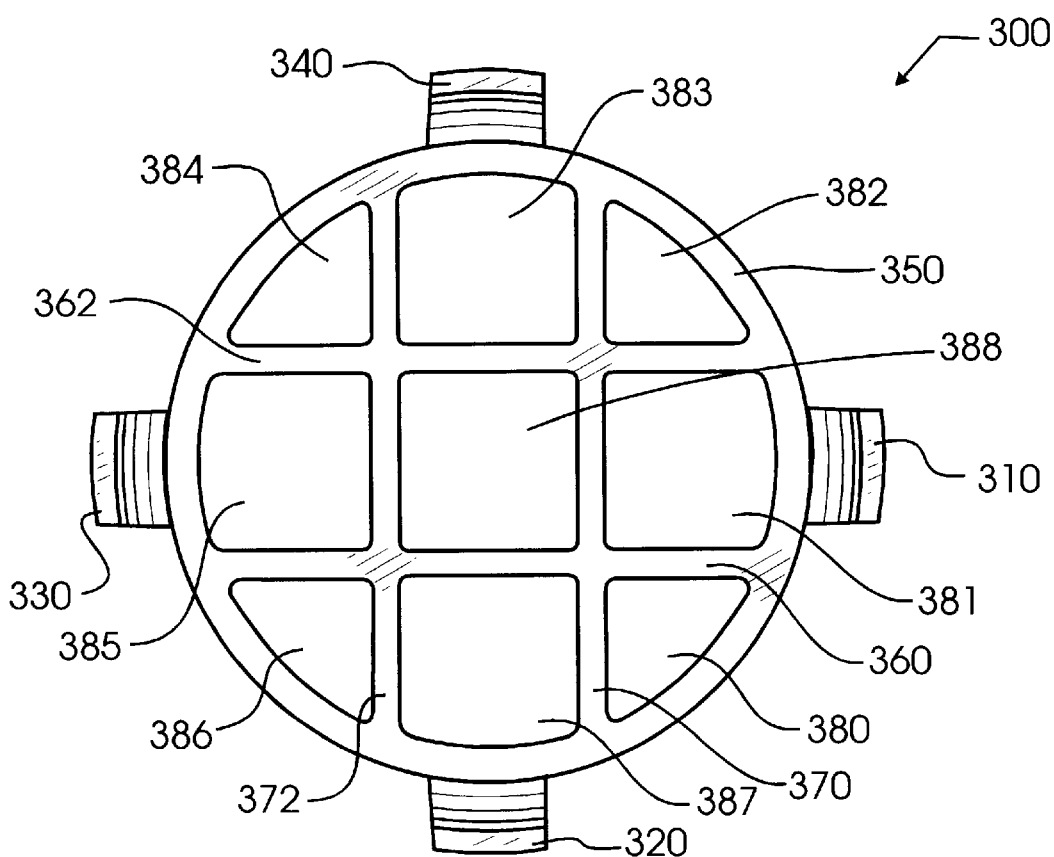
FIGS. 3a and 3b illustrate the preferred embodiment intake screen for use in conjunction with the preferred embodiment bulkhead of FIGS. 1 and 2, by top and side view, respectively.
Figure 3B:
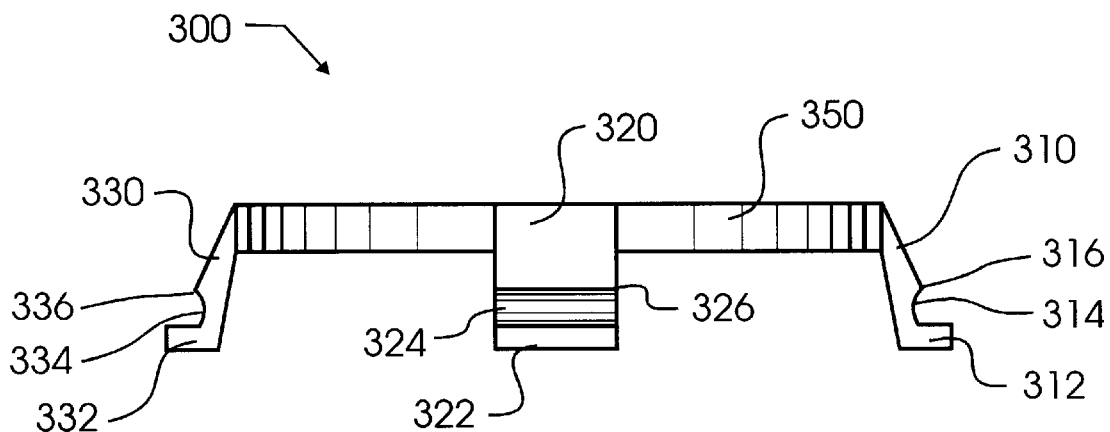
Figure 4:
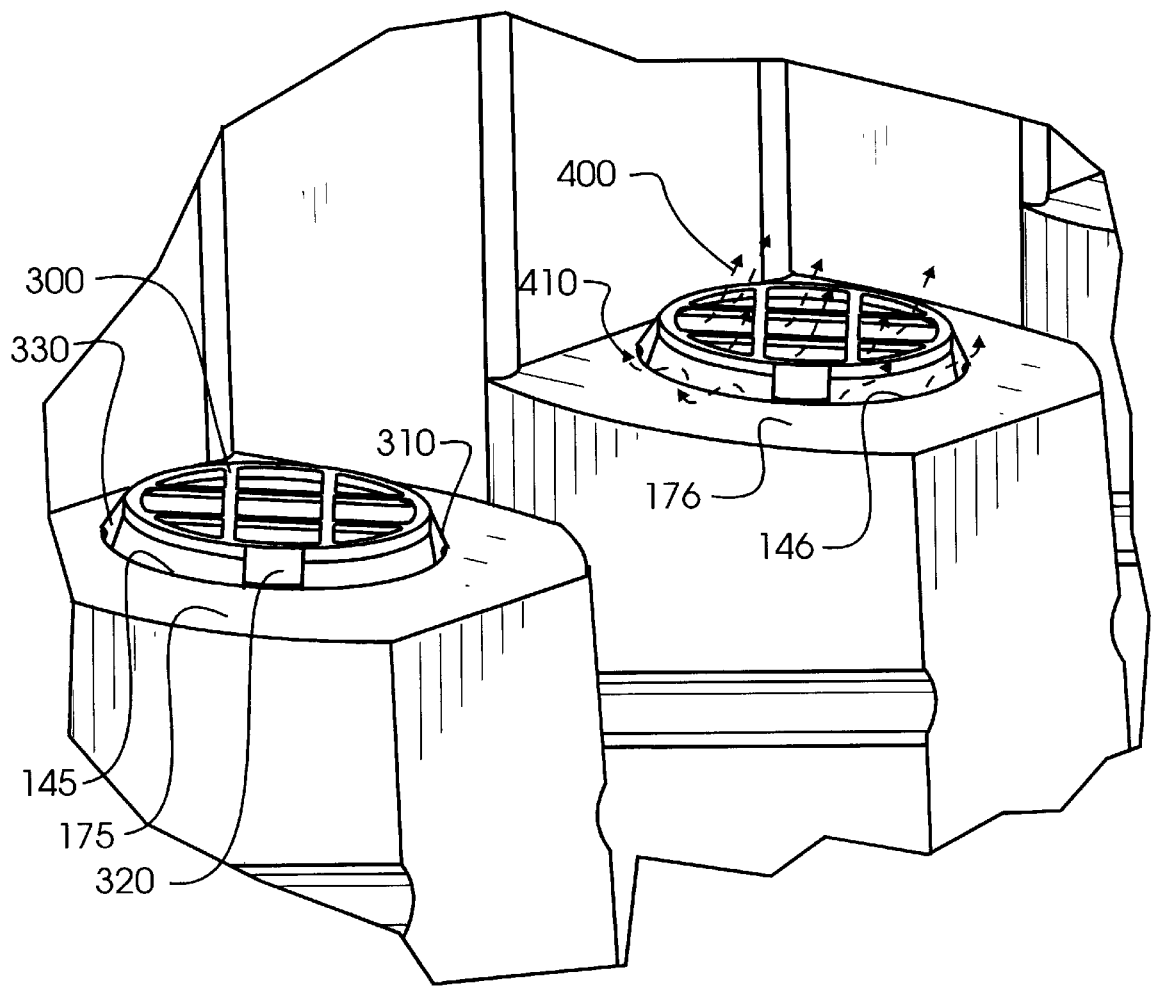
FIG. 4 illustrates the intake screen of FIGS. 3a and 3b installed into the bulkhead of FIGS. 1 and 2.

FIGS. 3a and 3b illustrate a preferred embodiment removable intake screen 300 from top and side views, respectively. While screen 300 is illustrated herein as circular to best fit into circular inlets 121–128 and 141–149, different inlet shapes and resulting intake screen 300 shapes are contemplated herein, such as squares, ovals and other shapes adaptable to the principles of the invention. Screen 300 includes an outer rim 350 which serves as a frame for the remainder of components. Within rim 350 are four lattice bars 360, 362 and 370, 372. These lattice bars form an orthogonal grid, though other grid patterns would likewise suffice such as diamonds and other known configurations, and those configurations may be of regular repeating lattice pattern or may also be irregular or unevenly spaced, as desired by a designer. The advantage of a square lattice grid is maintaining as small as possible opening to debris, while at the same time placing a minimum number of bars in the air stream, since each additional lattice bar obstructs a certain amount of air flow. Extending from rim 350 are four compliant legs 310, 320, 330 and 340. Each leg has a foot portion 312, 322, 332 and 342, respectively, trough portions 314, 324, 334 and 344, and upper notch surfaces 316, 326, 336 and 346, respectively. Foot portions 312, 322, 332 and 342 engage with air flow panel 100 on the cargo side thereof. Each trough portion 314, 324, 334 and 344 fits onto the inner surface of an inlet through panel 100, and finally upper notch surfaces 316, 326, 336 and 346 engage on the air passageway side of air flow panel 100, away from cargo. The actual location into inlets 145 and 146 is illustrated in FIG. 4. Installation may readily be done manually, by simply pressing screen 300 from the cargo side of each inlet therein, until each of the feet 312, 322, 332 and 342 engage flat against panel 100. Removal is also very simple for cleaning purposes, by squeezing foot 312 towards foot 332 and foot 322 towards foot 342. Once each of the legs 310–340 have been sufficiently deformed, upper notch surfaces 316, 326, 336 and 346 will release from air flow panel 100.

There are several significant features illustrated in this preferred embodiment. In particular, as can be seen by air flow lines 400 and 410 of FIG. 4, air may pass not only through openings 380–388 in screen 300, but may also pass between rim 350 and surface 176, thereby effectively enlarging the total air flow passageway size through screen 300. With the effective screen size enlarged by the actual area between rim 350 and surface 176, more debris may be trapped thereon prior to clogging. A second very significant feature is that the bulk of screen 300 is located inside of the air passageway formed between panel 100 and front wall 10. In the event of cargo shifting or being pressed against panel 100, screens 300 will be entirely protected from impact. Since legs 310–340 are compliant enough to flex under manual pressures to allow easy installation and removal, impact from cargo could be destructive. In this preferred embodiment, the only part of screen 300 exposed to the cargo side of panel 100 are feet 312, 322, 332 and 342, and these are all securely supported by panel 100. Moreover, air flow panel 100 also tends to restrict cargo access to screens 300 since screens 300 are each attached within a horizontal surface slightly displaced from the cargo face of panel 100. In the preferred embodiment, screen 300 is molded from high density polyethylene (HDPE) However, the material is not critical to the functioning of the screen and other materials may also be suitable. In this preferred embodiment, HDPE allows for less air obstruction for a given strength than would be present with, for example, expanded metal or wire screens, and the screens may be manufactured for a relatively low cost. In addition, the exact number of legs, such as leg 310, is not critical and more or fewer legs could be utilized. Similarly, the geometry of leg features is not critical, though most preferred, and other interlocking structures may also be utilized when contemplated in conjunction with the balance of the present disclosure.

In summary, therefore, while the foregoing details what is felt to be the preferred embodiment of the invention, no material limitations to the scope of the claimed invention are intended. Further, features and design alternatives that would be obvious to one of ordinary skill in the art are considered to be incorporated herein. The scope of the invention is set forth and particularly described in the claims hereinbelow.

I claim:

1. A removable intake screen removably attachable to openings through a tractor trailer refrigeration unit air flow panel comprising:
   a grid of material having openings interspersed therethrough;
   legs extending from said grid and having means to interlock with said refrigeration unit air flow panel;
   whereby said legs space said grid from said air flow panel into a protected air duct and allow removal and cleaning therefrom.

2. The removable intake screen of claim 1 wherein said grid further comprises an orthogonal lattice.

3. The removable intake screen of claim 2 wherein said orthogonal lattice is co-planar within a first plane.

4. The removable intake screen of claim 1 wherein said legs extend out of said first plane sufficiently to allow air to pass through said openings in said air flow panel and bypass said grid, whereby said intake screen offers a greater air flow pathway than available solely through said grid and wherein air may bypass said grid in the event said grid becomes blocked with debris.

5. The removable intake screen of claim 1 wherein said legs are equidistantly spaced about a periphery of said grid.

6. The removable intake screen of claim 1 wherein said legs further comprise a means for engaging said air flow panel at a point distal to said grid, said engaging means having a geometry complementary to said air flow panel for engaging therewith.

7. The removable intake screen of claim 1 further said legs further comprise a compliant material, whereby said legs may be flexed into and out of engagement with said air flow panel.

8. The removable intake screen of claim 1 wherein said air flow panel isolates said intake screen from contact with cargo within said tractor trailer.

9. The removable intake screen of claim 7 wherein said legs are accessed manually from a cargo side of said air flow panel.

10. A ventilation system for a cargo container having forced air recirculation through a heat exchanger and further having an intake air duct with a first opening in a cargo hold within said cargo container, said air duct extending to said heat exchanger thereby forming a relatively isolated air passage separate from said cargo hold, said cargo hold carrying cargo and debris therein which interacts with said forced air recirculation, wherein the improvement further comprises a snap-fit intake screen removable from said cargo hold.

11. The ventilation system of claim 10 further comprising extensions from said intake screen extending generally parallel to air flow through said screen which support and displace said screen from said first opening into said air passage, whereby said intake screen is isolated from said cargo and protected from damaging physical interaction therewith by said air duct.

12. The ventilation system of claim 11 further comprising means for interlocking said extensions to said air duct which is manually releasable from said air duct.

13. The ventilation system of claim 12 wherein said interlocking means further comprises a notch in said extensions which conforms to edges of said first opening.

14. The ventilation system of claim 13 wherein said extensions are compliant and bendable by a human grasp, whereby said interlocking means may be removed from said first opening manually.

15. A refrigeration system in combination with a tractor trailer for carrying temperature-sensitive cargo in a cargo area having a floor, walls and a ceiling, comprising:
   a heat exchanger;
   an air flow panel adjacent to but spaced from a wall of said tractor trailer and forming an air flow pathway therebetween leading into said heat exchanger,
   a first set of vertically extending generally rectangular polyhedrons having a first cargo facing surface, a second surface terminating at a bottom thereof with a first set of inlets through said air flow panel adjacent said cargo floor, a third and fourth surface each extending from said first cargo facing surface to said adjacent wall and having horizontal dimples therein which extend from said adjacent wall towards said cargo area and which terminate in a small groove, said small groove spacing said dimples from said first cargo facing surface;
   a second set of inlets through said air flow panel vertically displaced from said first set of inlets, said second set of inlets interspersed between said first set of inlets and alternating therewith, thereby opening into said cargo area in spaces between said first set of vertically extending rectangular polyhedrons;
   screens within said inlets having manually removable fasteners retaining said screens to said first and second set of inlets;
   whereby debris and other matter drawn into one of said first set of inlets is not directly drawn into others of said inlets due to the increased physical spacing between adjacent inlets, said removable screens prevent passage of debris into said air flow pathway and may be manually removed for cleaning, and said cargo facing surface flexes controllably in response to an impact originating from said cargo area before fully mechanically loading against said horizontal dimples.

16. The refrigeration system combined with a tractor trailer of claim 15, further comprising a joint air flow chamber wherein air passing from said first set of inlets mixes with air passing through said second set of inlets.

17. The refrigeration system combined with a tractor trailer of claim 16, further comprising reinforcements integrally formed in said air flow panel which serve to direct flow of air through said joint air flow chamber to said heat exchanger efficiently, while simultaneously reinforcing said air flow pathway against cargo-induced collapse.

18. The refrigeration system combined with a tractor trailer of claim 15, further comprising means displacing said screens from air flow panel into said air flow pathway.

19. The refrigeration system combined with a tractor trailer of claim 18, further comprising feet attached to said screens which are accessible from a side of said air flow panel opposite said air flow pathway, which may be displaced to remove said screens from said inlet.

20. The refrigeration system combined with a tractor trailer of claim 18, wherein said means for displacing said screens further comprises notches which engage said air flow panel.

* * * * *